(12) United States Patent
Snyder et al.

(10) Patent No.: US 7,153,114 B2
(45) Date of Patent: Dec. 26, 2006

(54) GRANULATION APPARATUS

(75) Inventors: Donald Malcolm Snyder, Evergreen, CO (US); Enrico Rizzi, Casnate con Bernate (IT)

(73) Assignees: Urea Casale S.A. (CH); Tuttle Prilling Systems, Evergreen, CO (US)

( * ) Notice: Subject to any disclaimer, the term of this patent is extended or adjusted under 35 U.S.C. 154(b) by 0 days.

(21) Appl. No.: 10/525,125

(22) PCT Filed: Apr. 27, 2004

(86) PCT No.: PCT/EP2004/004423

§ 371 (c)(1),
(2), (4) Date: Feb. 18, 2005

(87) PCT Pub. No.: WO2004/101131

PCT Pub. Date: Nov. 25, 2004

(65) Prior Publication Data

US 2005/0255183 A1   Nov. 17, 2005

(30) Foreign Application Priority Data

May 16, 2003  (EP) .................................. 03011206

(51) Int. Cl.
*B01J 2/02* (2006.01)
(52) U.S. Cl. .................. 425/8; 425/6; 425/7; 264/8; 264/9; 264/14
(58) Field of Classification Search ............ 425/6, 425/7, 8; 264/8, 9, 14
See application file for complete search history.

(56) References Cited

U.S. PATENT DOCUMENTS

| 4,495,086 A | * | 1/1985 | Hiroshima et al. ........... 516/20 |
| 4,556,090 A | * | 12/1985 | Pujari ........................ 141/59 |
| 4,585,167 A | | 4/1986 | Kholin |
| 6,062,487 A | * | 5/2000 | Bedetti ........................ 239/7 |

FOREIGN PATENT DOCUMENTS

| JP | 05 154425 A | 6/1993 |
| RU | 1 777 944 A | 11/1992 |

\* cited by examiner

*Primary Examiner*—Joseph S. Del Sole
*Assistant Examiner*—Maria Veronica Ewald
(74) *Attorney, Agent, or Firm*—Akerman Senterfitt

(57) ABSTRACT

Apparatus for the granulation of a predetermined substance provided in fluid, semi-fluid and similar state, comprising a prilling tower.

11 Claims, 4 Drawing Sheets

GRANULATION APPARATUS

FIELD OF APPLICATION

In its most general aspect the present invention refers to an apparatus for the granulation of a chosen substance provided in fluid, semi-fluid and similar state, like for example a melted substance.

In particular, the present invention refers to an apparatus comprising a tower (also called prilling tower in the rest of the description) inside which and at the top of which a device is supported that divides said substance into drops and simultaneously distributes them in said tower. Then the barely formed drops of the predetermined substance fall through the tower, in counter current to a flow of rising gas which solidifies them in substantially spherical granules (so-called "prills").

PRIOR ART

It is known that granulation techniques of substances generally provide that the predetermined substance is made available in a "fluid" condition, for example dispersed or dissolved in a liquid phase, or else even in melted state; then that it is divided into drops, and then that such drops are cooled so as to "transform" them into solid granules which are "monodispersed" as much as possible, in other words of a size and shape that are as uniform as possible.

And it is known that one of the most widespread granulation techniques uses a generally cylindrical tower, inside and at the top of which is supported a rotating bucket (also known as prilling bucket in the rest of the description and in the subsequent claims), fed with the fluid substance to be granulated, which provides for the formation of drops and their distribution inside the tower. At the base of said tower is provided a gaseous fluid blowing system which, rising in counter current to said drops, transforms them into granules.

It is equally known that to obtain, through an apparatus of the aforementioned type, granules of the chosen substance with optimal yield, the drops of said substance have to be uniformly distributed on the entire section of said tower. Moreover, it is required that said drops have a homogeneous, if not actually totally identical, shape and size, in order to obtain granules of said substance all of the same given size (i.e. monodispersed granules).

Now, it is also known that the drops uniformity of distribution inside the prilling tower is—among others—proportional to the rotation speed of the bucket that produces and distributes them. Consequently, it is known that, to optimise the distribution of the barely formed drops inside the prilling tower, it is required that the aforementioned bucket rotates at a speed, which is more and more higher with the increase of the tower diameter. For example, for tower of big diameter (and thus of high capacity), such rotating speed is in the order of 250 rpm.

To do so, in accordance with the prior art, the prilling bucket, positioned inside and at the top of the tower, is mounted at the end of a motorized shaft, with which it is made integral in rotation, said shaft extending for an appropriate portion outside of the prilling tower, where an engine of appropriate power is kinematically connected.

To create drops of homogeneous size and shape, in other words to obtain granules which are monodispersed as much as possible, the prior art teaches to give the prilling bucket a vibration which is as regular as possible and preferably extending in the vertical direction.

To do so, still in accordance with the prior art, an electronic or pneumatic vibrator device is used, associated with said motorized shaft, in particular with the portion thereof outside of the tower and, through said shaft, the vibration is transmitted to the prilling bucket integral with it.

An example of granulation apparatus of the aforementioned type is described in patent U.S. Pat. No. 4,585,167.

Now, if on the one hand an appropriate vibration of the prilling bucket satisfies the requirement of forming drops homogeneous in size and shape, on the other hand the transmission of said vibration to the prilling bucket, through the same motorized shaft which provides to its rotation, has forced the adoption of much reduced rotation speeds of the bucket with respect to those required for optimal uniformity of distribution and this to avoid clear dangers of structural breakage and the like.

An apparatus of the aforementioned type, as taught by the prior art to solve the outlined problem, is clearly a compromise solution and, as such, does not satisfy particularly the requirement of uniform distribution of the drops of substance to be granulated.

In other words, such an apparatus does not allow the production of monodispersed granules in an efficient manner, such as to be able to satisfy the ever growing productivity requirements requested by industry.

SUMMARY OF THE INVENTION

The technical problem underlying the present invention is that of providing an apparatus for granulating a chosen substance, having structural and functional characteristics such as to allow an optimal distribution of the drops of substance inside and at the top of a prilling tower, together with obtaining granules of said substance substantially completely monodispersed, overcoming the cited drawbacks with reference to the prior art described above.

This problem is solved according to the invention by an apparatus for the granulation of a substance provided in fluid, semi-fluid and similar state comprising a prilling tower, a prilling bucket revolvingly supported inside and at the top of said tower, a driving shaft, revolvingly supported at the top of said tower and extending in the axial direction thereof, said shaft having at least one end portion associated with said prilling bucket to command it into rotation, and a device to apply vibration to said bucket, characterized in that the bucket is mounted in a sliding way on said driving shaft in said axial direction and it is integral with it in rotation and in that said device is directly associated with said bucket to make it vibrate in said axial direction.

Advantageously, said device is mounted on said bucket, inside the prilling tower.

The sliding coupling, for example with grooved or feather profiles, between driving shaft and prilling bucket and the assembly of the vibration device directly on the bucket itself, ensure that the driving shaft is not "mechanically" influenced by the vibration of the bucket (i.e. it is not made to vibrate). In other words, the vibration intensity given to the prilling bucket and the speed of rotation thereof have absolutely no influence upon each other.

Therefore, it is possible to adopt, case by case, both the optimal speed of rotation for an optimal uniformity of distribution of the drops formed by the bucket, and the optimal intensity of vibration for the desired homogeneity of size and shape of said drops.

In short, the apparatus of the present invention allows to obtain monodispersed granules of the chosen substance, with a substantially improved yield with respect to what has been possible up to now with analogous apparatuses of the prior art.

Further features and the advantages of the apparatus according to the present invention will become clearer from the following description of an indicative and non-limiting example of an embodiment thereof, made with reference to the attached drawings.

DETAILED DESCRIPTION OF A PREFERRED EMBODIMENT OF THE INVENTION

Figure 1:
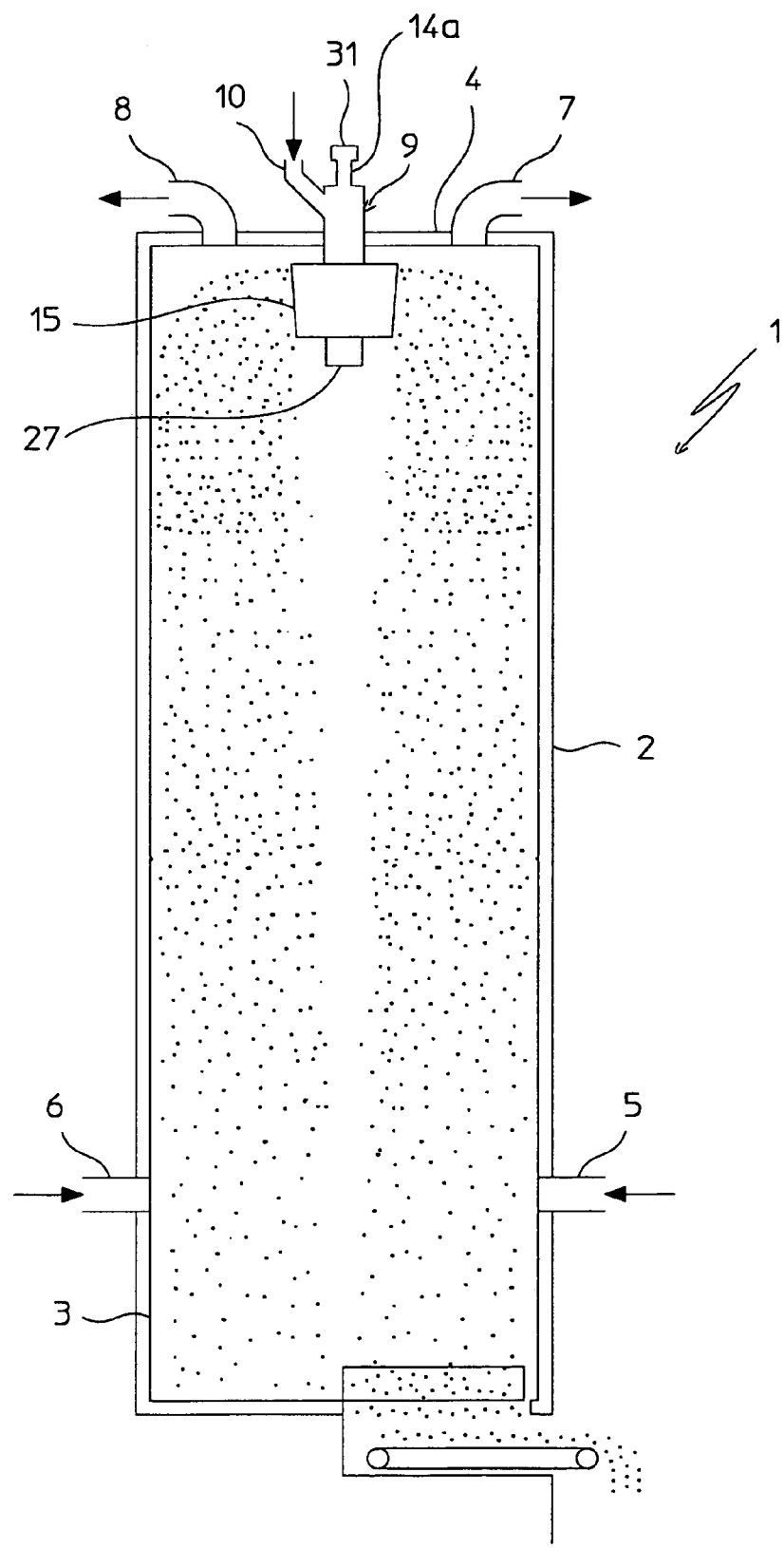
FIG. 1 shows a schematic view of an apparatus according to the present invention.

With reference to FIG. 1, an apparatus according to the present invention comprises a prilling tower 1, the cylindrical shell 2 of which, with vertical axis A—A, is closed at the opposite ends by a base plate 3 and a top wall 4 (top or top panel) of the tower 1.

In a totally schematic way, with 5 and 6 are indicated ducts for the input of a continuous rising flow of a predetermined gas (for example air) into the tower 1, and near to the base 3 thereof, with appropriate and predetermined flow rates and temperatures for the granulation process which one intends to actuate in said tower. Analogous ducts are indicated with 7 and 8, provided at the top 4 of said tower 1, for the discharge of such a flow of gas and of what may be "subtracted" by it to the fluid substance to be granulated.

The top wall 4 is crossed centrally by a tubular cylindrical hopper or duct 9, for the input of said fluid substance in the granulation tower 1. This duct 9 extends coaxially to the shell 2, is supported fixed, with conventional and not shown means, by the top wall 4 thereof, and has a portion 9a outside of said shell and a portion 9b inside it. The portion 9a of said duct 9 leads to a duct 10, for feeding the substance to be granulated.

It should be noted that the cylindrical duct 9 is closed at the opposite ends, outside and inside said shell 2, by respective disc-plates 11, 12. Moreover, the inner portion 9b is equipped with a plurality of slits 13, extending along the generating lines thereof, circumferentially distributed on its side surface and of a size suitable for delivering the fluid substance to be granulated inside a bucket 15 (described in detail later on).

The tubular duct 9 is crossed axially by a motorized shaft 14, revolving around its vertical axis and passing trough openings 11a, 12a, centrally provided in the plates 11 and 12 respectively, of said duct 9, with possible interposition of gaskets (not represented).

Said shaft 14 has, on one side, a portion 14a extending above the tubular duct 9, kinematically subjugated to and commanded into rotation by an engine 31, with appropriate characteristics. On the other side, the shaft 14 has a portion 14b, with a reduced diameter, extending below the duct 9, and with which it defines an annular shoulder 16.

Inside said shell 2 and near to the top wall 4 thereof, the substantially frusto-conical prilling bucket 15, having perforated side wall 15a, between upper and lower bases 15b and 15c, is coaxially positioned, to allow the supply of the fluid substance to be granulated splitted in a corresponding plurality of equal jets inside the tower 1.

At the lower base 15c, outside the bucket 15, a base block or hub 17, of predetermined thickness is coaxially fixed. Said base block 17 is axially crossed by a hole 18. In accordance with a characteristic of the present invention, the portion 14b of reduced diameter of said motorized shaft 14 is engaged in a revolving and sliding manner in said hole 18. This coupling between motorized shaft 14 and prilling bucket 15, is substantially of the type with grooved or feather profile.

Figure 3:
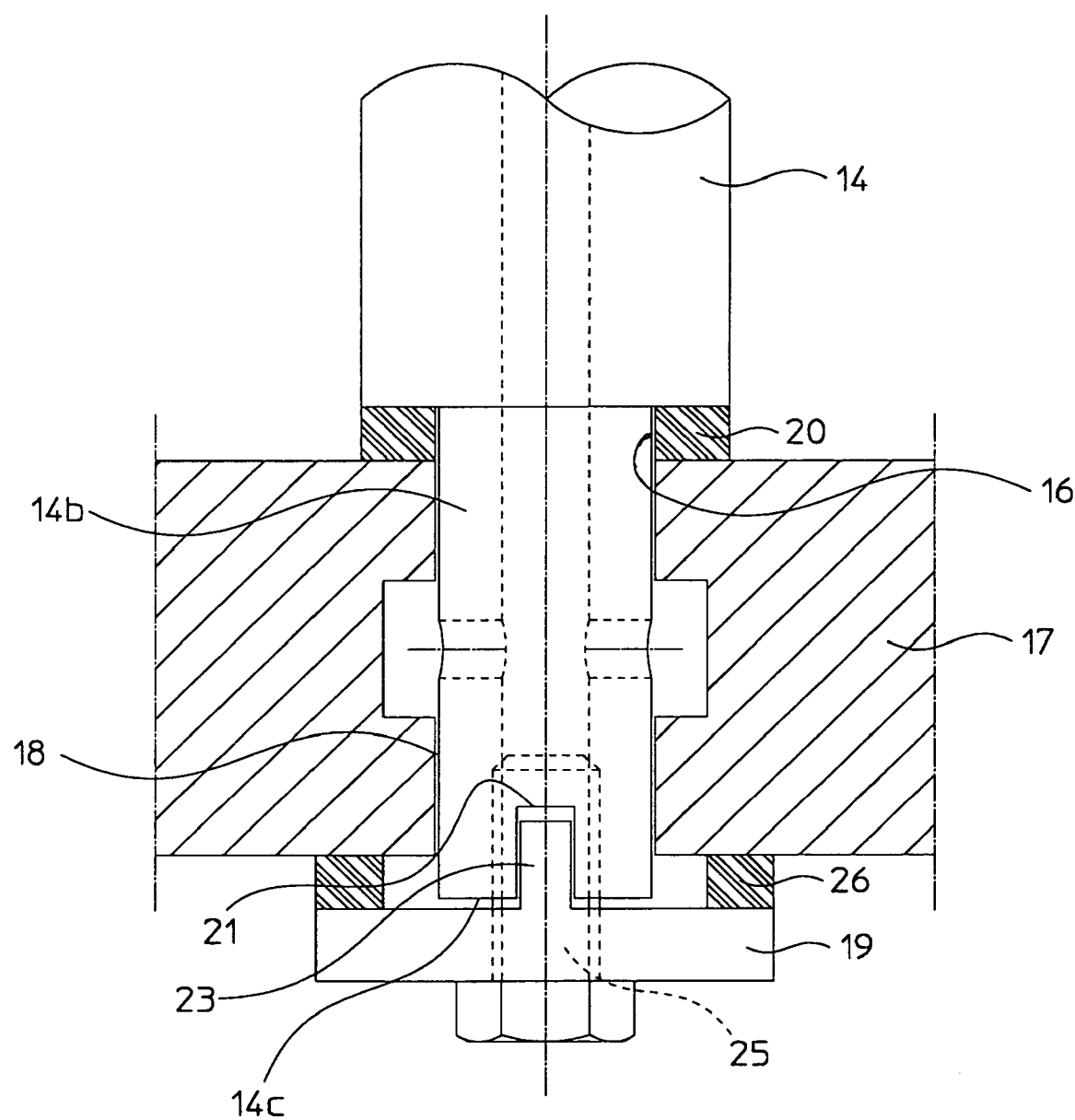
FIGS. 3 and 4 represent further enlarged views of the same detail of FIG. 2, seen from two directions perpendicular to each other.
Figure 4:
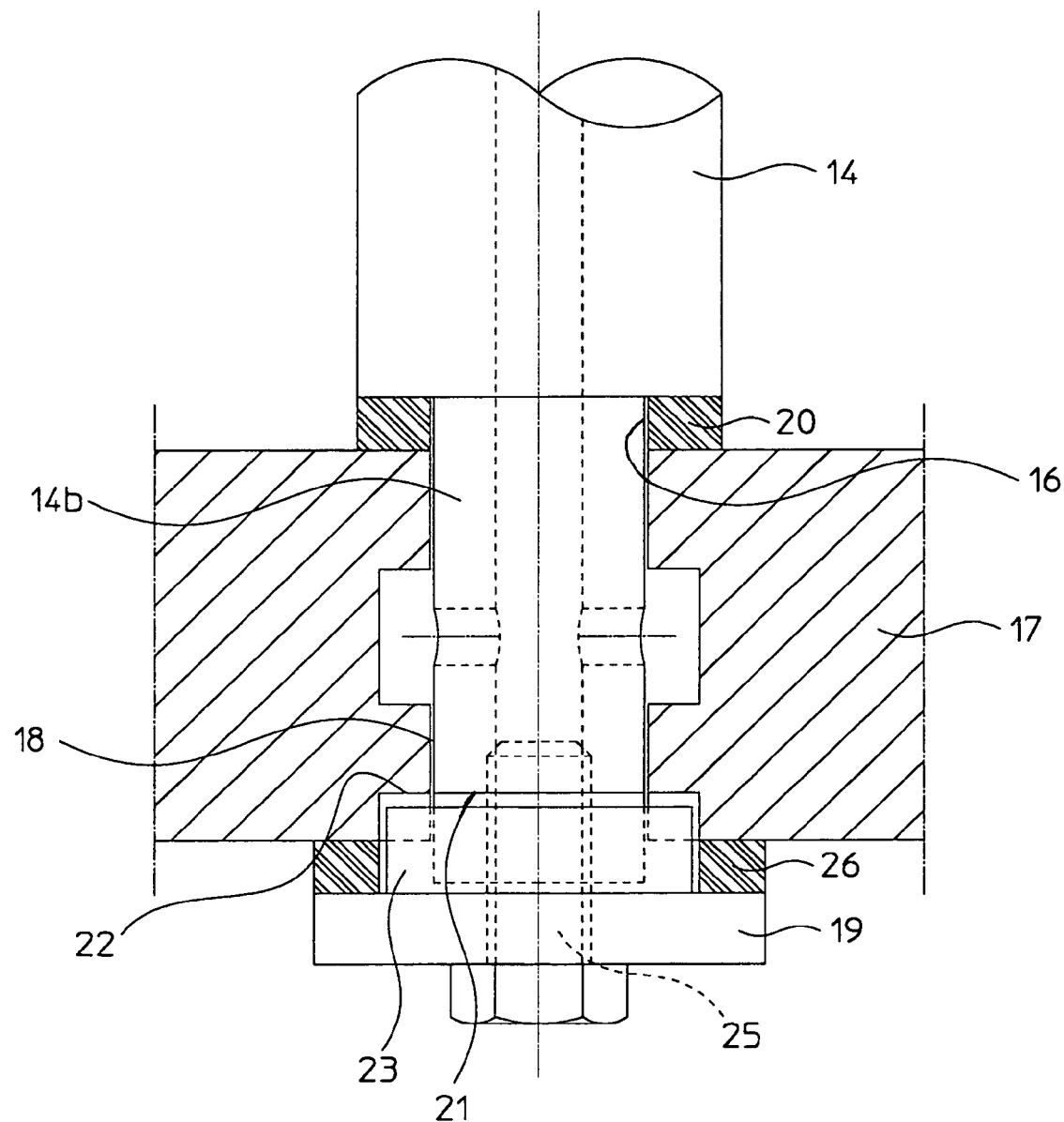

In particular and according to a preferred embodiment, such a coupling is obtained (FIGS. 3, 4) through frontal engagement between the free end 14c of the portion 14b of said motorized shaft 14, and a disc 19 fixed to said portion 14 in predetermined distanced relationship from it.

More specifically, in said free end 14c a first groove 21 is formed. Analogously, the base block 17 is provided at its lower free end, and extending from said hole 18 towards the external diameter thereof for a predetermined distance, with a second grove 22. Whereas, the disc 19 is equipped, on a face thereof, with a corresponding projection 23 intended to engage, substantially as a keywasher, the aforementioned, aligned, grooves 21 and 22. The axial sliding of the bucket 15 on said shaft 14 is ensured in this case by the fact that the height of said projection 23 is less than the depth of the corresponding groove 21.

As quoted above, the disc 19 is fixed to the shaft 14, through a screw 25 coaxial to the shaft 14, in predetermined distanced relationship from the base block 17 and between said base block 17 and the disc 19 a ring 26 made from elastically deformable material is positioned, in substantial contact with both.

An analogous ring 20, made from elastically deformable material is positioned between the annular shoulder 16 and said lower base 15c of the bucket 15.

The deformable material of rings 20, 26 can be an elastomeric material (such as rubber). In the alternative to rings 20, 26, springs (not shown), such as helicoidal springs or disc springs (Belleville springs), can be used.

As shall be seen more clearly from the rest of the description, said rings 20 and 26 are functional at the vibration which one intends to give to the prilling bucket 15.

In accordance with a characteristic of the present invention, a vibration of predetermined optimal intensity and mainly orientated in the direction of the axis A—A of the tower 1 is given to said prilling bucket 15. For such a purpose an appropriate device is used, schematised in 27, which, still in accordance with the present invention, is mounted directly on the bucket 15 and inside the same prilling tower 1.

According to a preferred embodiment, the device 27 is positioned in a carter 28, fixed to the base block 17 of said bucket 15. Advantageously, such device 27 is of the pneumatically actuated type. In this particular case, the flow of air necessary for the operation of the device 27 is fed to it through a duct 29 in communication with a second duct 30, formed in the base block 17 and open in said carter 28. The duct 29 extends above the prilling bucket 15, preferably up to the upper portion 14a of the driving shaft 14, from where it is placed in communication with an appropriate pressurised fluid source, not represented since it is per se known.

Preferably, the flow of air coming from the pressurized fluid source is fed through a duct 40 in an air connecting box 41, which is in fluid communication with the duct 29 and is supported fixed with conventional means, such as feet 44, on the disc plate 11 of the cylindrical duct 9

Figure 2:
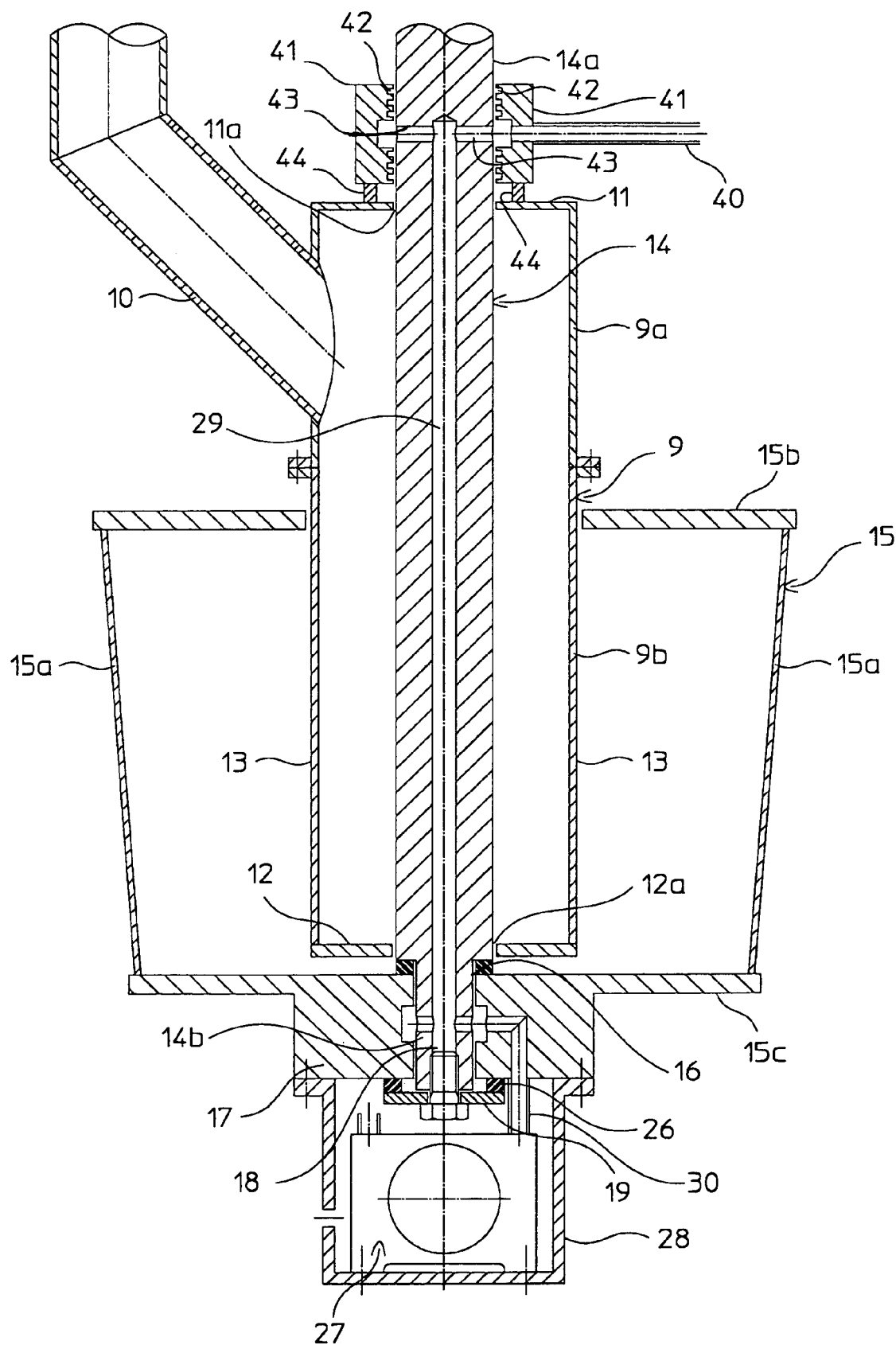
FIG. 2 shows a schematic and enlarged view of a detail of the apparatus of FIG. 1.

According to the embodiment shown in FIG. 2, the duct 29 is axially formed in the driving shaft 14 and the air connecting box 41 is associated thereto through suitable gas sealing means, such as gaskets 42. In this case, the shaft 14 is also provided with at least one connecting duct 43 (two in the example) for putting into fluid communication said air connecting box 41 with the internal duct 29.

In the granulation device of the present invention, the driving shaft 14 can carry out the important dual function of support and rotation of the prilling bucket 15, totally independently from the intensity of vibration given to said bucket precisely because the coupling between bucket and shaft is of the sliding type (substantially using grooved or feather profiles), whereas the device 27 is mounted directly on the bucket itself. The aforementioned apparatus therefore allows the prilling bucket to be rotated at high speeds, so as to ensure the optimal distribution of the substance to be granulated, as well as to give said bucket high frequencies of vibration, so as to ensure the obtainment of definitely monodispersed granules. The whole thing avoiding those structural yielding dangers that the aforementioned combination of speed of rotation and intensity of vibration determines in granulation apparatuses of the prior art.

The invention claimed is:

1. Apparatus for the granulation of a substance provided in fluid, semi-fluid and similar state comprising a prilling tower (1), a prilling bucket (15) revolvingly supported inside and at the top of said tower (1), a driving shaft (14), revolvingly supported at the top of said tower (1) and extending in the axial direction (A—A) thereof, said shaft having at least one end portion (14b) associated with said prilling bucket (15) to command it into rotation, and a device (27) to apply vibration to said bucket (15), characterized in that the bucket (15) is mounted in a sliding way on said driving shaft (14) in said axial direction (A—A) and it is integral with it in rotation and in that said device (27) is directly associated with said bucket (15) to make it vibrate in said axial direction (A—A).

2. Apparatus according to claim 1, characterized in that said driving shaft (14) extends coaxially through said prilling bucket (15) and has an end portion (14b) coupled with said bucket (15), in a sliding manner in the aforementioned axial direction (A—A) and integral in rotation.

3. Apparatus according to claim 2, characterized in that said bucket (15) is coaxially equipped at the bottom with a base block (17), crossed by an axial hole (18), engaged in a sliding way by said end portion (14b) of said shaft (14).

4. Apparatus according to claim 1, characterized in that said bucket (15) is mounted on said driving shaft (14) with a coupling substantially using grooved profiles.

5. Apparatus according to claim 3, characterized in that said end portion (14b) of said driving shaft (14) has a reduced diameter with respect to that of said shaft (14) with which it defines an annular shoulder (16) and in that it comprises a disc (19) fixed to said portion (14b) in a predetermined distanced relationship from it, between said annular shoulder (16) and the base block (17) and between said disc (19) and the free end of said portion (14b) of the driving shaft (14) being positioned respective rings (20, 26) of elastically deformable material or springs.

6. Apparatus according to claim 1, characterized in that said device (27) is mounted on said bucket (15), inside the prilling tower (1).

7. Apparatus according to claim 6, characterized in that said device (27) is positioned inside a carter (28), fixed to said base block (17) below said bucket (15).

8. Apparatus according to claim 7, wherein said device (27) is of the pneumatically actuated type.

9. Apparatus according to claim 8, wherein a duct (29) for supplying compressed air to said device (27) extends from above said bucket (15) to said base block (17) and is open in said carter (28).

10. Apparatus according to claim 9, wherein said duct (29) for supplying compressed air is partially axially extended in said driving shaft (14) and partially in said base block (17).

11. Apparatus according to claim 9, wherein said duct (29) for supplying compressed air is in fluid communication with a pressurised fluid source through an air connecting box (41).

* * * * *